(12) United States Patent
Staab

(10) Patent No.: US 12,474,222 B2
(45) Date of Patent: Nov. 18, 2025

(54) TEMPERATURE SENSOR

(71) Applicant: WIKA Alexander Wiegand SE & Co. KG, Klingenberg/Main (DE)

(72) Inventor: Ulrich Staab, Biebergemuend (DE)

(73) Assignee: Wika Alexander Wiegand SE & Co. KG, Klingenberg (DE)

( * ) Notice: Subject to any disclaimer, the term of this patent is extended or adjusted under 35 U.S.C. 154(b) by 911 days.

(21) Appl. No.: 17/702,331

(22) Filed: Mar. 23, 2022

(65) Prior Publication Data
US 2022/0307914 A1    Sep. 29, 2022

(30) Foreign Application Priority Data

Mar. 25, 2021 (DE) ............... 10 2021 107 608.0

(51) Int. Cl.
| | |
|---|---|
| G01K 7/06 | (2006.01) |
| G01K 1/08 | (2021.01) |
| G01K 1/143 | (2021.01) |
| G01K 7/02 | (2021.01) |
| H10N 10/17 | (2023.01) |
| H10N 10/80 | (2023.01) |
| H10N 10/81 | (2023.01) |
| H10N 10/817 | (2023.01) |

(52) U.S. Cl.
CPC ............. *G01K 7/06* (2013.01); *G01K 1/08* (2013.01); *G01K 1/143* (2013.01); *G01K 7/02* (2013.01); *H10N 10/17* (2023.02); *H10N 10/80* (2023.02); *H10N 10/81* (2023.02); *H10N 10/817* (2023.02)

(58) Field of Classification Search
CPC ........... G01K 1/143; G01K 1/08; G01K 7/04; G01K 7/06; G01K 7/02; H01N 10/80; H01N 10/81; H01N 10/817; H01N 10/17
USPC .................................................. 374/208, 179
See application file for complete search history.

(56) References Cited

U.S. PATENT DOCUMENTS

| | | |
|---|---|---|
| 4,043,200 A | 8/1977 | Finney |
| 4,164,433 A | 8/1979 | Granahan et al. |
| 5,141,335 A | 8/1992 | Wannamaker et al. |
| 11,175,190 B2 | 11/2021 | Korn et al. |
| 2017/0191879 A1 * | 7/2017 | Martin .............. G01K 7/223 |
| 2021/0164842 A1 | 6/2021 | Grabenauer et al. |

FOREIGN PATENT DOCUMENTS

| | | | |
|---|---|---|---|
| DE | 102017100268 A1 | 7/2018 | |
| WO | WO2020035402 A1 | 2/2020 | |
| WO | WO-2020053402 A1 * | 3/2020 | ........... B81B 7/02 |

* cited by examiner

*Primary Examiner* — Mirellys Jagan
(74) *Attorney, Agent, or Firm* — Muncy, Geissler, Olds & Lowe, P.C.

(57) ABSTRACT

A temperature sensor, having a first conductor made of a first material comprising an end section, a second conductor made of a second material, which differs from the first material, comprising an end section, and a casing for receiving the end sections of the two conductors and for positioning in a process atmosphere or in a process fluid and/or on a surface of a process structure. According to the invention, a measuring point body structure is provided, which is arranged within the casing or on the casing, wherein the first conductor and the second conductor directly or indirectly form a thermocouple in or on the measuring point body structure and the measuring point body structure comprises a barrier material.

20 Claims, 5 Drawing Sheets

TEMPERATURE SENSOR

This nonprovisional application claims priority under 35 U.S.C. § 119(a) to German Patent Application No. 10 2021 107 608.0, which was filed in Germany on Mar. 25, 2021, and which is herein incorporated by reference.

BACKGROUND OF THE INVENTION

Field of the Invention

The present invention relates to a temperature sensor comprising a thermocouple, in particular for a high temperature measurement.

Description of the Background Art

Such temperature sensors are generally known from the prior art.

For example, a thermocouple temperature sensor for measuring the temperature of a surface is known from U.S. Pat. No. 5,141,335 A. The thermocouple wires, also referred to as thermowires, are guided here with an insulating material in a sheathed thermocouple to a casing part. The sheathed thermocouple is inserted into an opening of the casing and welded to be sealed. The thermocouple wires are guided within the casing part to a measuring point at the bottom of the casing and welded there with each other and with the casing bottom. They thus form a thermocouple, which is arranged directly in the casing bottom. The temperature sensor is then placed with the casing bottom on a surface of which the temperature is to be measured and is welded to it. The thermocouple in the casing bottom is thus practically in direct contact with the surface. As a result, it has a high measurement accuracy and fast response time.

Typical applications for such temperature sensors are temperature measurements on pipelines or plant vessels that are part of an industrial plant. Such plants can be found, for example, in the chemical and petrochemical industries. Often, such pipelines or plant vessels are then also arranged within a process chamber, for example a blast furnace or a reactor. The temperature sensors can then be exposed in particular to an aggressive, abrasive and/or very hot atmosphere. Such atmospheres are hereinafter generally referred to and summarized as process atmospheres. Pipes, plant vessels and all other structures that are part of an industrial plant and whose surface is the subject of temperature measurements with generic temperature sensors are hereinafter generally referred to and summarized as process structures. In such applications, in addition to guiding and positioning the thermocouple and the thermocouple wires at or on a desired measuring point, the sheathed thermocouple and the casing fulfill a protective function: they shield the process atmosphere to a certain extent and/or for a certain time from the thermocouple wires and the thermocouple.

Furthermore, temperature sensors known from the prior art are also used to measure the temperature of a process fluid within a process chamber or within a pipe—generally, within a process structure. For these applications, so-called thermowells are generally used, which are sufficiently described in the prior art, for example in WO 2020/035402 A1, which corresponds to US 2021/0164842, which is incorporated herein by reference. If further reference is made below to an arrangement of a temperature sensor within a process fluid, this also refers to arrangements in which the temperature sensor, or a thermowell that accommodates the temperature sensor, is immersed in a process fluid or in which a temperature sensor comes into contact with a process fluid. In this application, in addition to guiding and positioning the thermocouple and the thermocouple wires at a desired measuring point within the process fluid or adjacent to the process fluid, the thermowell or a similar structure also has a protective function: It shields the process fluid to a certain extent and/or for a certain period of time from the thermowires and the thermocouple, but at the same time allows for thermal contact.

The process fluid may be present in a liquid phase, a gas phase, as a solid, for example as dust or granules, or as a compound. The same applies to the process atmospheres mentioned above. These two different terms are used in the following only to clearly separate the different applications from each other: The term process atmosphere refers to a fluid present in the environment of a temperature sensor, which sensor may be protected by a casing or a sheathed thermocouple against chemical, mechanical or similar influences by said fluid, while the temperature sensor is not intended to measure the temperature of this process atmosphere, but instead the temperature of a surface of a process structure within this process atmosphere. The term process fluid, on the other hand, refers to a fluid in the environment of a temperature sensor, which sensor is protected by a thermowell or a similar structure against the action of said fluid, but said temperature sensor serves the purpose of measuring the temperature of exactly this fluid as accurately as possible.

Corresponding temperature sensors from the previously described applications in the prior art have in common that in high-temperature applications, these are affected in the long term due to influences from the harsh environment, in particular from the chemical or mechanical properties of the process atmosphere or the process fluid and/or from the high temperature of the surface of the process structures or the process atmosphere or the process fluid. It can be observed that the measured values increasingly deviate from an actual temperature of the surface, the atmosphere, or the fluid. This is commonly referred to as measured value drift. That is, the measured value drifts away from the actual value. Consequently, the temperature sensors must be checked regularly and, if necessary, replaced. Either is extremely cost-intensive, as a process plant usually has to be powered down first, i.e., shut down.

In order to make it possible to check the temperature sensors during operation, techniques and arrangements are described in various publications with which a so-called in-situ calibration of a temperature sensor can be carried out. For example, DE 10 2017 100 268 A1, which corresponds to US 2019/0360876, describes an arrangement of a thermocouple temperature sensor within a thermowell, together with a reference junction, which generates a reference signal by a physical phase transition at a certain temperature and thus enables a one-point calibration. These and similar arrangements allow for an approximate correction of a measured value drift in some applications. However, it has been shown that in particular thermocouples for surface temperature measurements in the high-temperature measuring range cannot be sufficiently adjusted by this method. One reason for this may be that possible reference points generated by these systems are usually at lower temperatures that are not reached during ongoing operation of the process plant. Thus, the reference points are far away from the actual working range, so that the calibration is not optimal. Apart from this, impairments in the thermocouples or thermowires could be present in these applications, which for methodological reasons cannot be corrected by this in-situ calibration.

SUMMARY OF THE INVENTION

It is therefore an object of the present invention to provide a novel temperature sensor comprising a thermocouple.

In an exemplary embodiment, the temperature sensor includes a first conductor made of a first material comprising an end section, a second conductor made of a second material, which differs from the first material, comprising an end section, as well as a casing for receiving the end sections of the two conductors. The casing is designed for positioning in a process atmosphere or in a process fluid and/or on a surface of a process structure. According to the invention, the temperature sensor comprises a measuring point body structure, which is arranged within the casing or on the casing. The first conductor and the second conductor directly or indirectly form a thermocouple in or on the measuring point body structure and the measuring point body structure comprises a barrier material.

In a particularly advantageous manner, the present temperature sensor is less susceptible to impairments caused by environmental influences or even excludes them. At the same time, it exhibits a low response time and high measurement accuracy.

The first conductor and the second conductor, combined hereinafter also both conductors, are formed, for example, as wires or thermocouple wires. End sections are in particular those end sections or ends of the two conductors which together, directly, or indirectly, form a thermocouple and are intended for temperature measurement in a process atmosphere or a process fluid and/or on the surface of a process structure. For this purpose, these are in particular led to a measuring point on the casing or inside the casing. To protect against environmental influences, the conductors can be led on a route outside the casing to a designated reference point where the conductors are electrically connected to an evaluation unit through a mineral-insulated cable, also referred to as an MI cable or simply sheathed thermocouple. Such a sheathed thermocouple usually has a metal sheath, in particular a steel sheath.

A casing within the meaning of this invention in particular has the property of receiving the end sections of the two conductors. In the context of the invention, this means that the two conductors are introduced to the casing and penetrate at least in sections into the casing, i.e., into the casing interior or a free internal volume of the casing, and thereby pass into their respective end section, in order to then form a thermocouple directly or indirectly at a provided measuring point or an intended contact point. The casing thus fulfils the function of protecting the end sections of the two conductors from environmental influences and positioning the formed thermocouple at a designated measuring point, in particular fastening it to such a point. The casing may be shaped according to casings known from the prior art and may be arranged in particular at an open end of the sheathed thermocouple or be connected to it, for example by a welded connection. This means that the MI cable passes directly into the casing, where the end sections of the conductors then form a thermocouple. As a result, the two conductors can be protected to a certain extent and/or for a certain time from adverse environmental influences. Also, the casing may be formed by a section, in particular by a closed end of the MI cable or sheathed thermocouple itself. The casing or a free internal volume of the casing may be filled with an electrical insulating material. The insulating material can be a mineral or ceramic powder, as it is also used, for example, to fill a sheathed thermocouple. As a result, good insulation of the conductors can be achieved away from the measuring point body structure.

The first and second conductors form a thermocouple directly or indirectly in or on the measuring point body structure. The measuring point body structure, in particular the part of the structure, which is formed from the barrier material, effectively protects the thermocouple, i.e., the measuring point, from impairments caused by certain environmental influences, whereby long-term function and measured value accuracy of the temperature sensor are made possible.

The measuring point body structure for the purposes of this invention or a further development may be a one-piece or multi-part structure. It may comprise one or more parts formed from the barrier material, or it may be formed entirely from the barrier material. In the case of a multi-part measuring point body structure, all or some of the parts may be arranged directly to one another or be connected to each other or be separated from each other, in particular separately arranged in or on the casing. Due to the variety of these design options for the measuring point body structure, the latter can be adapted to different installation situations. In particular, embodiments can be selected that are particularly cost-effective to produce or are particularly robust. Concrete advantages of individual embodiments and further developments are the subject of the following description parts.

The measuring point body structure being arranged within the casing means for the purposes of this invention in particular that the measuring point body structure may have no direct contact with the process atmosphere or the process fluid, which optionally surrounds the casing, and/or with the surface of the process structure, on which the casing is optionally arranged. Thus, there is a material section of the casing between the measuring point body structure and the environment. This section may be formed in particular by a casing wall, wherein the measuring point body structure may be arranged, for example, in a recess or depression on the inside of the casing wall. However, the measuring point body structure can also be arranged within a free internal volume of the casing in such a way that it does not come into contact with the casing itself. By means of these design variants, the optionally very high-quality barrier material, which acts particularly effectively against certain environmental influences and effects, can be advantageously combined with the protection by the optionally less high-quality casing material against mechanical effects, such as impacts or abrasion.

Arranging the measuring point body structure on the casing means in the sense of this invention in particular that the measuring point body structure is not completely separated by the casing from the surrounding process atmosphere or the process fluid or the adjacent surface of the process structure, i.e., is not completely enclosed by the casing. For example, the measuring point body structure may be arranged in such a way in a casing wall that it penetrates it and comes into direct contact, in sections, with the process fluid or the surface of the process structure of which the temperature is to be measured. In such an example, the measuring point body structure is no longer particularly protected by a casing wall against mechanical attacks as in the aforementioned design variant, but in this variant an even faster response time of the temperature sensor and a more accurate measured value can be achieved advantageously since the measuring point body structure is directly exposed to the temperature source to be measured.

A direct formation of a thermocouple means in the sense of this invention in particular that the first conductor and the second conductor touch each other directly and are electrically connected, i.e., the material of the first conductor forms a direct contact point with the material of the second conductor. This contact point then forms the thermocouple, i.e., the measuring point of the sensor.

Such a direct contact point may be formed adjacent to or on a surface of the measuring point body structure. In this case, the measuring point body structure or the part of the measuring point body structure, which is formed from the barrier material, is arranged in such a way that it is arranged between the thermocouple and that part of the process atmosphere or the surface of the process structure that is closest to the thermocouple. Thus, the thermocouple can be effectively protected against a large source of negative influences caused by the environment using a small amount of barrier material. The barrier material may be formed in particular as a thin plate or disc, which is inserted, for example, in a depression on the inside of a casing wall. If the contact point is arranged in the measuring point body structure, it may be provided that the measuring point body structure or the part or parts of the measuring point body structure, which is or are formed from the barrier material, is or are arranged in such a way that the thermocouple is protected from environmental influences from several spatial directions. In particular, the contact point can be completely surrounded by barrier material or embedded in it, which increases the protective function against impairments caused by environmental influences.

An indirect formation of a thermocouple means in the sense of this invention in particular that the first conductor and the second conductor do not touch each other directly. That is, the material of the first conductor does not form a direct, immediate point of contact with the material of the second conductor. Instead, in this case, the two conductors are conductively connected to each other by one or more other material sections. These other material sections may be material sections of the measuring point body structure, in particular material sections made of the barrier material and/or of the casing. What is referred to in the sense of this invention as a directly formed thermocouple is therefore composed in particular of a series of at least two different thermocouples. The measuring point body structure is designed in particular in such a way that these individual, different thermocouples are arranged close to each other, so that they are substantially at the same temperature level.

The measuring point body structure may have a single measuring point body that receives the end section of the first conductor and/or the end section of the second conductor or at least is in direct contact with both conductors. The receipt of a conductor is understood in particular as the end section of the conductor being inserted into the measuring point body and being held by it. The measuring point body may be formed, for example, in a sleeve shape comprising two separate, parallel channels or pot-shaped comprising two separate holes. Between two channels or holes, a partition wall may be arranged, which, for example, has a thickness of at least 0.1 mm. The wall thickness of the sleeve or the thickness of an outer wall surrounding the holes can also be at least 0.1 mm. The measuring point body can also be designed in several parts. The measuring point body can, for example, be formed by two touching partial bodies, each of which only receives the end section of one of the two conductors, or by two half shells, which enclose the end sections of the two conductors between each other, without the end sections touching each other directly. Furthermore, the measuring point body can also receive only the end section of one of the two conductors, while the end section of the other conductor is in direct contact with a surface of the measuring point body but is not received by the measuring point body. Such direct contact between a measuring point body and a conductor can already come about by the fact that the conductor is led to the surface of the measuring point body, touches it, or is connected to it, in particular is connected to it in a material-locking manner. In this way, the measuring point body can also be in direct contact with both conductors and not receive any of the end sections. For this purpose, the measuring point body may be formed in particular as a thin plate or disc and be arranged in such a way that it is arranged between the thermocouple and that part of the process atmosphere, the process fluid or the surface of the process structure that is closest to the thermocouple. Thus, the thermocouple can be effectively protected against a large source of negative influences caused by the environment using a small amount of barrier material, i.e., by means of a relatively small measuring point body.

The measuring point body itself can be formed of the barrier material. As a result, the measuring point body structure can be particularly simple, in particular can only be formed of only the individual measuring point body. Thus, in particular, a simple and cost-effective production is made possible. The indirectly formed thermocouple in this example then comprises in particular a first thermocouple, formed by the contact between the material of the first conductor and the barrier material, and a second thermocouple, formed by the contact between the barrier material and the material of the second conductor. In this example, the two different thermocouples can be arranged particularly close to each other, so that they essentially assume the same temperature. This minimizes the risk of impairing the measurement accuracy due to different temperatures of the two measuring points.

In an example, in which a thermocouple is also indirectly formed, the end sections of the two conductors can be electrically connected to each other via at least one section of the measuring point body structure, in particular via a section of the barrier material of the measuring point body structure, and at least one section of the casing. Although this basically increases a number of the individual different thermocouples which contribute to the indirect formation of the thermocouple, these can be arranged close to each other so that they can essentially take the same temperature and thus, no disadvantages arise. For this purpose, such a design can contribute to an extended modularization of the structure of the temperature sensor and in particular to a simplification of the measuring point body structure and its components.

For example, the measuring point body structure may have two separate, spaced measuring point bodies. Each of these measuring point bodies receives the end section of one of the two conductors or is in direct contact with it. The two measuring point bodies can be formed of the barrier material. These separate measuring point bodies can be designed in particular as sleeves, each of which receives the end section of one of the two conductors. Likewise, the measuring point bodies may be pot-shaped or be formed as thin plates or discs, wherein in the last two cases each of the two measuring point bodies is in direct contact with an end section of one of the two conductors. The two measuring point bodies are arranged at a distance from each other, so they do not touch each other directly. In an example, they are arranged, for example, in depressions, recesses or openings in a casing wall. The two separate measuring point bodies are electrically connected to each other via the material of the casing wall. This further development enables a particularly simple and cost-effective structure. For example, particularly compact and simply shaped measuring point bodies can be used in this way, which can be manufactured in large quantities and are therefore very inexpensive.

If the two separate measuring point bodies, also referred to hereinafter as the first and second measuring point bodies, are themselves formed directly from the barrier material, the number of components and the assembly effort are further reduced. The indirectly formed thermocouple then comprises a first thermocouple, formed by the contact between the material of the first conductor and the barrier material of the first measuring point body, a second thermocouple, formed by the contact between the barrier material of the first measuring point body and the material of the casing wall, a third thermocouple, formed by the contact between the material of the casing wall and the barrier material of the second measuring point body, as well as a fourth thermocouple, formed by the contact between the barrier material of the second measuring point body and the material of the second conductor. The four different thermocouples can be arranged particularly close to each other, so that they essentially assume the same temperature. This minimizes the risk of impairing the measurement accuracy due to different temperatures of the four measuring points.

Both the above-mentioned examples of the invention, which have a single measuring point body, and those which have two separate measuring point bodies, can be further improved by the further developments described below with regard to the design of the measuring point body or the separate measuring point bodies.

The measuring point body or bodies can each be formed integrally and/or as one-piece and formed of the barrier material. As a result, the temperature sensor can be manufactured particularly easily and cost-effectively, as the number of parts is reduced.

The measuring point body or bodies can be formed in several parts, wherein particularly all parts are formed of the barrier material. In this example, the number of components may increase, but in this way particularly favorable assembly steps can be made possible. For example, the measuring point body or bodies may each be formed of two half shells or plates, between which one or both conductors can be clamped. Thus, it is then not necessary to solder or weld the conductors to the measuring point bodies. In addition, the manufacturing tolerances of the measuring point bodies can be selected more generously.

The measuring point body or bodies can be formed by a coating or a finish of the end section of at least one of the conductors with the barrier material or by wrapping the end section of at least one of the conductors in a film made from the barrier material. The measuring point body or bodies thus do not necessarily have to be formed by a molded body with dimensions of the same order of magnitude, such as the wire thickness of the two conductors, but can also be formed by thin, optionally microscopically thin layers. The end sections can be coated in particular by immersing the end sections in a melt of the barrier material.

For example, the thickness of the coating from the barrier material must only be at least strong enough that possible unevenness of the surface of the two thermocouple conductors is compensated, i.e., the barrier-material layer is not broken by such unevenness or roughness. This has the advantage of requiring only extremely small amounts of the barrier material. In addition, the number of components is further reduced, which makes it possible to achieve an even more cost-effective production and to make the structure particularly compact.

The coating of the end section or the end sections can also be formed of a series of two or more layers of different barrier materials. As a result, the measuring point body structure can counteract a particularly large variety of environmental influences.

The measuring point body or bodies can be pot-shaped or plate-shaped or sleeve-shaped. These shapes are simple and inexpensive to manufacture, but at the same time they are very well suited to be brought into direct contact with the thermocouple or to receive one or more conductors.

The measuring point body or bodies can be arranged by a press fit in or on the casing. As already referred to in the above, arrangement in the casing means in particular that the measuring point body or bodies do or does not come into direct contact with the process atmosphere, the process fluid or the surface of the process structure but is/are separated from it by a—albeit in particular very thin—casing wall. In the context of this further development, arrangement on the casing also means in particular that the measuring point body or bodies do come into direct contact with the process fluid or the surface of the process structure, of which the temperature is to be measured, for example penetrates or penetrate a casing wall. By using a press fit, the measuring point body or bodies can be reliably and mechanically stably arranged in or on the casing without the need for additional parts such as screws, a solder or similar.

The greatest cause of impairments of generic temperature sensors is because of a diffusion of particulates, molecules or particles from the process atmosphere, the process fluid, the surface of the process structure or from the material of the casing into the thermocouple or into one or both conductors that form the thermocouple. This process is very slow, often on a time scale of months or years. A frequent consequence of this diffusion is that the actual measuring point, i.e., the place where the thermal voltage is generated, is no longer exactly at the contact point of the two thermowires or conductors, but instead "drifts away" from this contact point along the conductors. This is referred to hereinafter as measuring point drift. Depending on the specific conditions of the individual application, the measuring point is then located at a position that has a temperature that is higher or lower than the one at the actual contact point. Thus, the measurement signal gradually drifts away from the actually relevant value. However, the occurrence of this effect cannot be determined without removal and complex material analysis of the temperature sensor. A process plant operator will therefore be controlling the plant processes based on temperature readings that deviate more and more from the actual process temperature, which can lead to enormous drops in efficiency or even dangerous conditions in many applications.

This effect is effectively countered and thus the protective function of the measuring point body structure is implemented particularly effectively. This is done, for example, by selecting the barrier material in such a way that, at the same temperature, it has a lower diffusion coefficient for at least one component present in the process atmosphere or in the process fluid or in the material of the surface of the process structure or in the material of the casing than the materials of the two conductors themselves. Thus, a diffusion of these components, i.e., particulates, molecules, or particles, into the thermocouple can be effectively stopped or at least drastically delayed, which enables a significantly higher long-term measurement accuracy of the temperature sensor and stops or at least strongly slows down measuring point drift. This component from the process atmosphere or the process fluid or the surface of the process structure or the material of the casing is hereinafter also referred to as a foreign component. However, this designation is not intended to indicate that the foreign component cannot be part of the first material or the second material. The term is merely intended to underline that a concrete particulate, particle, or molecule of this foreign component would diffuse from the process atmosphere, the process fluid, the surface of the process structure or the material of the casing—quasi from outside the conductors—into one of the conductors, in particular an end section, if this is not prevented or delayed by the barrier material.

This foreign component may in particular be one or more of the following substances: carbon, sulfur, chromium, nickel, iron, copper, ora compound of one of these substances. In addition, and in general, the protective effect of the measuring point body structure can be implemented particularly effectively if it has a particularly low diffusion coefficient for one or more of the foreign components, which, however, can also be found in the first material of the first conductor and/or the second material of the second conductor.

Another major cause of impairments of generic temperature sensors is from a diffusion of particulates, molecules, or particles from one of the two conductors or thermowires via the contact point into the other conductor or thermowire. Such components are hereinafter referred to as intrinsic components. This effect also takes place very slowly and gradually and can lead to a drift of measuring points over months and years, and its occurrence is not detectable during operation. In a possible further development of the invention, this effect can be countered particularly effectively, and thus the protective function of the measuring point body structure can be implemented particularly effectively, by forming the thermocouple only indirectly in or on the measuring point body structure by the two conductors. The electrical contact between the two conductors only occurs as a result of a section of the barrier material and the barrier material is chosen in such a way that it has at the same temperature, a lower diffusion coefficient for at least one intrinsic component present in the material of the first conductor or the second conductor than the materials of the two conductors themselves. As a result, corresponding advantages can be achieved with this further development, as they have already been mentioned with respect to the last-described further development.

The protective effect of the measuring point body structure with regard to this last-mentioned diffusion of an intrinsic component from one conductor to the other conductor can be implemented particularly effectively if the barrier material has a particularly low diffusion coefficient for one or more of the intrinsic components, which occur only in the material of one of the two conductors or are present in one of the two conductors at a significantly higher concentration than in the material of the other conductor. For example, this component may be: Chromium, if the two conductors form a type K or type N thermocouple, or Nickel, if the two conductors form a type T thermocouple, or Iron, copper, or nickel, if the two conductors form a type J thermocouple, or Rhodium, if the two conductors form a type R or type S or type B thermocouple, or Rhenium, if the two conductors form a type C or type A thermocouple.

The barrier material of the measuring point body structure can be chosen in such a way that at the same temperature, this has higher thermal conductivity and/or lower electrical resistance and/or higher chemical reaction inertia and/or lower catalytic force than the materials of the first conductor and/or the second conductor and/or the casing. As a result, the temperature sensor can be further improved in a variety of ways. For example, high thermal conductivity can cause the temperature sensor to have a shortened, fast response time. Low electrical resistance contributes to a more accurate, stronger measurement signal. With high chemical reaction inertia and/or low catalytic force, the measuring point body structure comprising the barrier material—apart from the possible, already mentioned protective or delaying effect with regard to diffusion effects—can also effectively protect the thermocouple from other environmental influences, for example from damage caused by chemical reactions.

The positive protective effects mentioned in the previous sections can be achieved particularly effectively in parts or overall if the barrier material is selected from one of the following substances or materials in accordance with a further possible refinement: Gold or a gold alloy, or Platinum or a platinum alloy, or Tantalum or a tantalum alloy, or Tungsten or a tungsten alloy.

At least one of the two conductors can be arranged by force fit or material connection in or on the barrier material of the measuring point body structure. By means of a force-fitting or material-locking connection, a mechanically stable connection of the conductors to the barrier material can be achieved; a reliable electrical connection between the conductor or conductors and the barrier material can also be established, which is advantageous in particular in conjunction with the indirect formation of a thermocouple in or on the measuring point body structure as described in the preceding sections.

The temperature sensor can additionally comprise a third conductor from a third material comprising an end section and a fourth conductor from a fourth material, which differs from the third material, comprising an end section. The third conductor and the fourth conductor in or on the measuring point body structure directly or indirectly form another thermocouple, which is hereinafter also referred to as a reference junction.

The findings and explanations made in the preceding sections in connection with the first and second conductors concerning the end sections of the conductors, the direct or indirect formation of a thermocouple in or on the measuring point body structure, the receipt of end sections in a measuring point body and the establishment of direct contact between an end section and a measuring point body are applicable mutatis mutandis to the third and fourth conductors.

By forming the reference junction, it is advantageously possible to determine during operation whether a protective effect is still given by the barrier material of the measuring point body structure or whether the temperature sensor is already impaired by environmental influences, because the measuring point body structure is damaged, for example. This determination can be made by a continuous comparison of the measured values of the two thermocouples. Environmental influences as well as effects caused by them, in particular the diffusion effects by foreign components or intrinsic components described in the preceding sections, will not have an absolutely identical effect on both thermocouples, since the thermocouple and the reference junction will not be absolutely identical due to variability in manufacturing. Thus, increasing impairments caused by environmental influences are reflected in an increasing deviation of the measured values from each other or a change in a ratio of the measured values to each other. Thus, the operator of the process plant can actually determine during operation that the protective effect of the measuring point body structure has diminished and/or an impairment of the temperature sensor has begun and can thus replace the temperature sensor in good time.

The third conductor and/or the fourth conductor can have a diameter that is greater than the diameter of the first conductor and/or the second conductor. In addition, or alternatively, at least the third material differs from the first material and the second material. Also, all four materials of the four conductors can be different. The third conductor and the fourth conductor thus form a thermocouple of a type that differs from the type of thermocouple formed by the first and second conductors. The proposed geometric or material differences can achieve in an advantageous manner that the thermocouple, which is formed by the first and second conductor, and the reference junction differ even more clearly and thus react even more differently to possible environmental influences, as well as any effects caused by the latter. This allows for the monitoring and detection functions that were mentioned in the previous section to be performed even more precisely and reliably.

The various refinements and further developments of individual aspects of the invention described above can be combined with each other, provided that they do not contradict each other. The teaching underlying the invention is not limited to the specific order or sequence of features chosen here.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
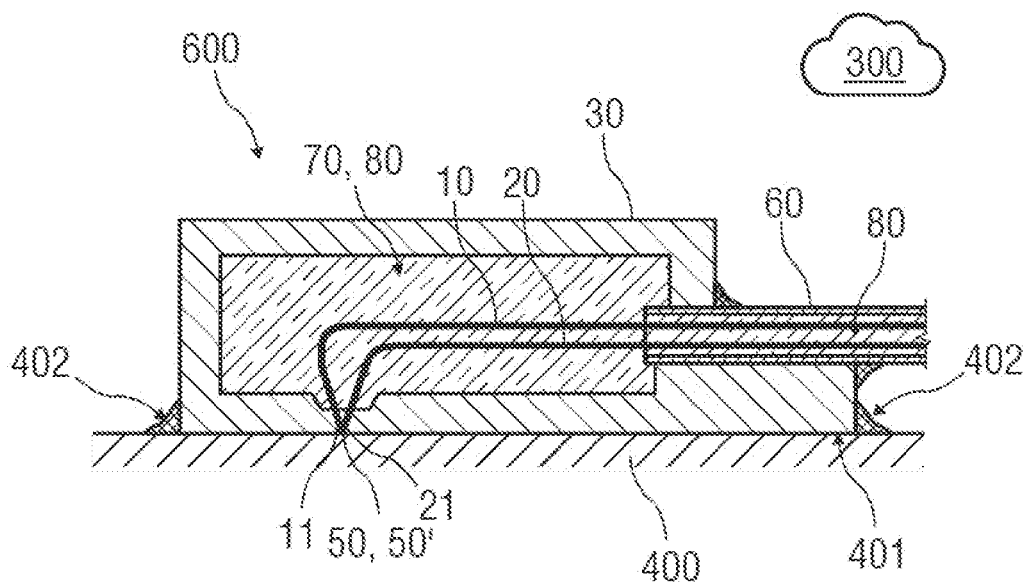
FIG. 1 is schematically a sectional representation of a temperature sensor according to the prior art.

FIG. 1 shows a sectional representation of a temperature sensor 600 as it is known from the prior art. A first conductor 10 comprising an end section 11 and a second conductor 20 comprising an end section 21 are led to a casing 30 by means of a sheathed thermocouple 60. The sheathed thermocouple 60 is inserted into an opening of the casing 30 and welded to be sealed to the casing 30. This means that the opening of the casing 30 is sealed tightly by the sheathed thermocouple 60 welded into it. Both the sheathed thermocouple 60 as well as a free internal volume 70 of the casing 30 are filled with a mineral or ceramic insulating material 80, for example a powder. The conductors 10, 20 formed of different materials, are led to a contact point 50' in the casing 30 and there form a thermocouple 50 by a connection of their end sections 11, 21. In this example, the first conductor 10 and the second conductor 20 are welded to a thin section of a casing wall. Thus, the thermocouple 50 is almost directly in contact with a surface 401 of a process structure 400, the temperature of which is to be measured. The casing 30 is connected to the surface 401 by welded seams 402.

Although such a temperature sensor 600 usually has a fast response time and high measurement accuracy, the thermocouple 50 is primarily only protected by the casing 30 against impairments caused by environmental influences stemming from the process atmosphere 300 surrounding the casing 30 or the process structure 400. And even this protection can—depending on the specific application—only be given in the medium term.

Figure 2:
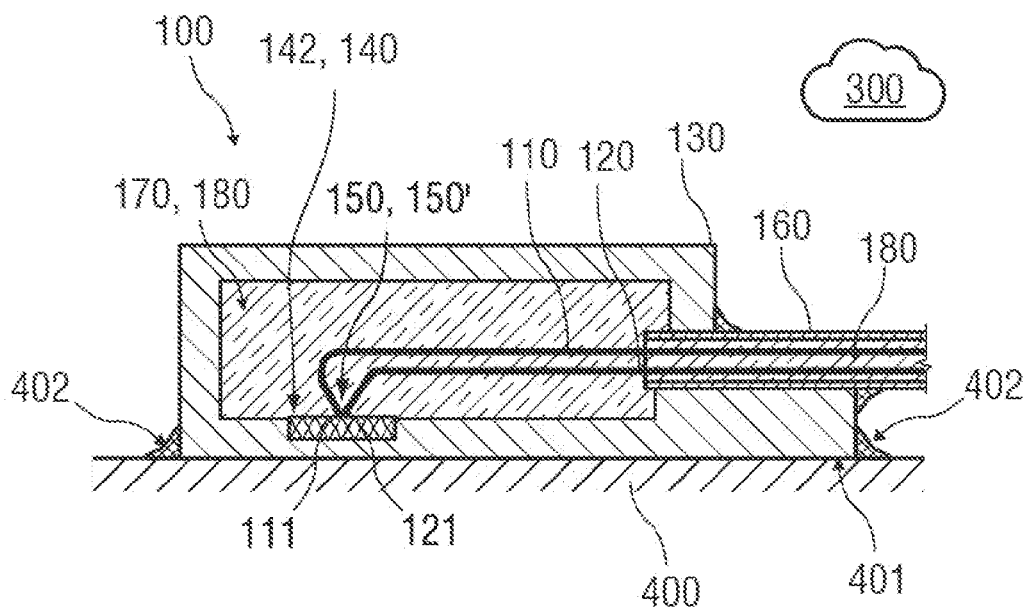
FIG. 2 is schematically a sectional representation of a temperature sensor comprising a measuring point body structure.
Figure 3:
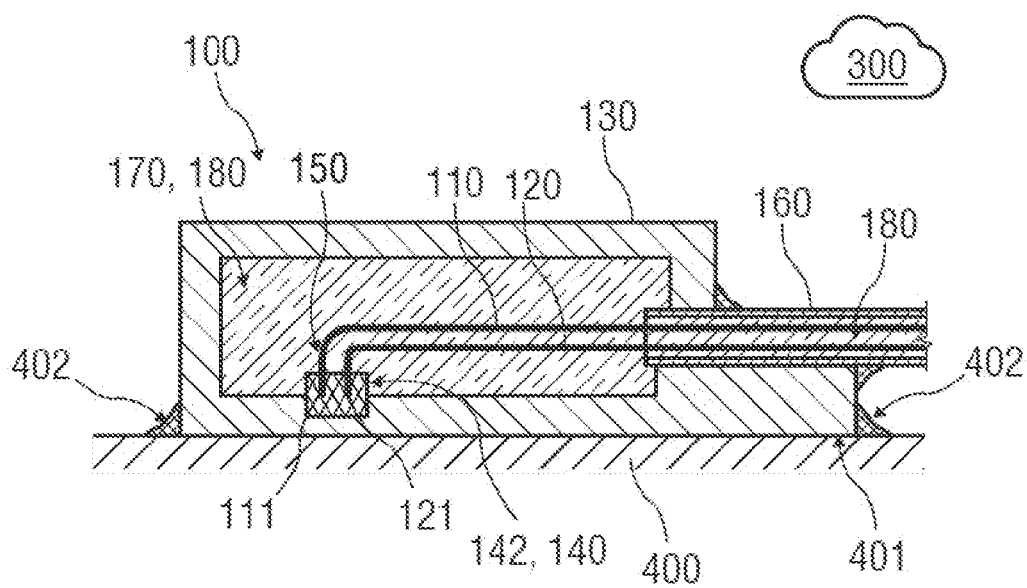
FIG. 3 is schematically a sectional representation of a temperature sensor comprising a measuring point body structure.
Figure 4:
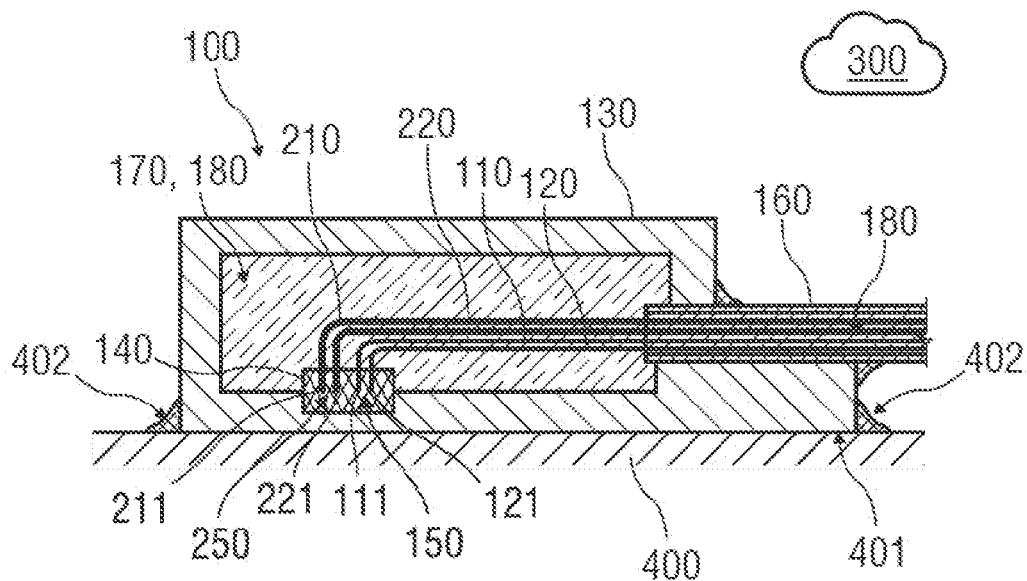
FIG. 4 is schematically a sectional representation of a temperature sensor comprising a measuring point body structure and a third and fourth conductor.

FIGS. 2, 3 and 4 show a sectional representation of a possible example of a temperature sensor 100 comprising a measuring point body structure 140. A first conductor 110 comprising an end section 111 and a second conductor 120 comprising an end section 121 are led to a casing 130 by a sheathed thermocouple 160. The second conductor 120 is made of a different material than the first conductor 110. For example, the sheathed thermocouple 160 and a free internal volume 170 of the casing 130 are filled with a mineral or ceramic insulating material 180, for example a powder, which is indicated here by a hatching of the surfaces. The casing 130 is arranged on a surface 401 of a process structure 400 and connected to it by welded seams 402. Furthermore, the casing 130 is surrounded by a process atmosphere 300, which is schematically indicated by a cloud shape. The casing 130 and the sheathed thermocouple 160 protect the two conductors 110, 120, as well as the thermocouple 150 formed by their end sections 111, 121 to a certain extent from impairments caused by the process atmosphere 300. For measuring the temperature of the surface 401 of the process structure 400, the thermocouple 150 is accordingly arranged within the casing 130 close to the surface 401.

In FIG. 2, the measuring point body structure 140 comprises a single, one-piece measuring point body 142 in the shape of a disc or plate. The end sections 111, 121 of the two conductors 110, 120 are led to a contact point 150' on a surface of the measuring point body 142 and there directly connected to each other. By means of this connection, a thermocouple 150 is formed.

In FIG. 3, the measuring point body structure 140 also includes a single, one-piece measuring point body 142. However, the end sections 111, 121 of the two conductors 110, 120 are not led to a common contact point 150', but instead reach the measuring point body 142 at separate points. By means of these connections between the end section 111 of the first conductor 110 and the measuring point body 142 as well as between the end section 121 of the second conductor 120 and the measuring point body 142, the end sections 111, 121 of the two conductors 110, 120 indirectly form a thermocouple 150.

In FIG. 4, the temperature sensor 100 additionally has a third conductor 210 and a fourth conductor 220, which are also led by the sheathed thermocouple 160 to and into the casing 130. The fourth conductor 220 is made of a material different from the third conductor 210. The first and second conductors 110, 120 with their end sections 111, 121 are introduced to the measuring point body structure 140 with the measuring point body 142 and there indirectly—via the measuring point body structure 140—form a thermocouple 150. The third and fourth conductors 210, 220 are also introduced with their end sections 211, 221 to the measuring point body structure 140 and also indirectly form a reference junction 250 there via a respective contact with the measuring point body structure 140.

By means of the measuring point body structure 140 or by means of the measuring point body 142, the respective directly or indirectly formed thermocouples 150 as well as the reference junction 250 from FIG. 4 are advantageously protected against impairments caused by environmental influences, because the measuring point body structure 140 comprises a barrier material. In particular, the measuring point body 142 in FIG. 2 and FIG. 3 may be formed of the barrier material.

In the examples in FIGS. 2 to 4, the barrier material has in particular a lower diffusion coefficient for at least one foreign matter present in the process atmosphere 300 and/or in the material of the casing 130 and/or in the material of the surface 401 of the process structure 400 than the materials of the respective conductors 110, 120, 210, 220. As a result, the barrier material can effectively protect the thermocouple 150 or the reference junction 250 from diffusion of such foreign components into the thermocouple 150 or into the reference junction 250. A drift of measuring points caused by the diffusion of foreign components can thus be effectively avoided or at least enormously delayed.

In addition, the barrier material in the examples in FIG. 3 and FIG. 4 has in particular a lower diffusion coefficient for at least one intrinsic component present in the material of at least one of the conductors 110, 120, 210, 220 than the materials of the conductors 110, 120, 210, 220 themselves. Thus, the barrier material can effectively protect the indirectly formed thermocouple 150 or the indirectly formed reference junction 250 in this arrangement against diffusion of such intrinsic components from one conductor 110, 120, 210, 220 to the other. A drift of measuring points caused by the diffusion of intrinsic components can thus be effectively avoided or at least enormously delayed.

In the example shown in FIG. 4, at least one of the two conductors 210, 220 formed of a material which differs from the materials of the first conductor 110 and the second conductor 120. Thus, the reference junction 250 already differs from the thermocouple 150 by its material combination. Furthermore, the third and fourth conductors 210, 220 have a greater wire thickness than the first and second conductors 110, 120. Due to these two differences, it can be achieved that the reference junction 250 reacts differently to impairments caused by environmental influences than the thermocouple 150. Thus, the occurrence of such effects can be detected by measurement techniques. Such impairments could occur in particular if the measuring point body structure 140 is damaged.

Figure 5:
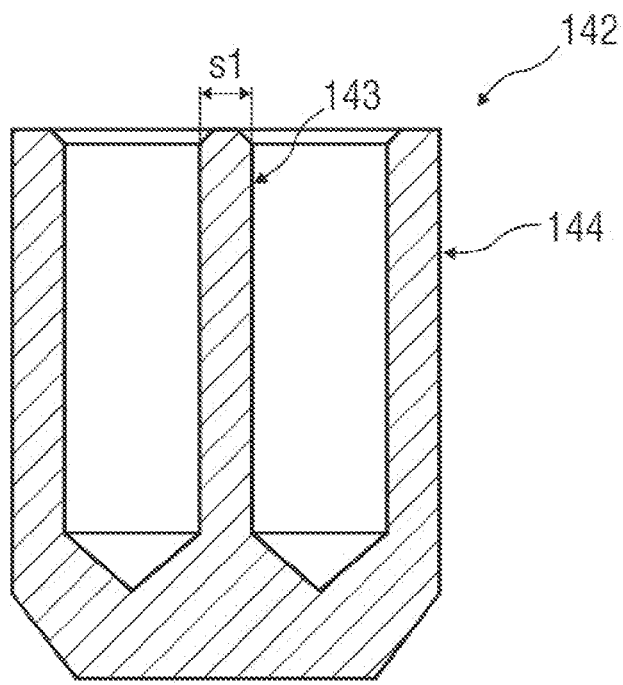
FIG. 5 is schematically a sectional representation of a measuring point body.
Figure 6:
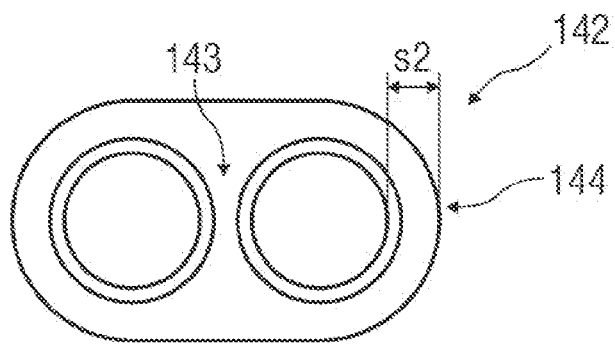
FIG. 6 is schematically a top view of the measuring point body according to FIG. 5.

FIGS. 5 and 6 show a one-piece measuring point body 142. In FIG. 5, the measuring point body 142 can be seen in a cross-section, in FIG. 6 in a top view of a surface, which in the installed state in a temperature sensor 100 faces an end section 111 of a first conductor 110 and an end section 121 of a second conductor 120. The measuring point body 142 is made of a barrier material. The measuring point body 142 has two recesses or two holes into which the end sections 111, 121 can be inserted. Between these recesses or holes, a partition wall 143 is arranged, which in particular has a thickness s1 of at least 0.1 mm. The recesses or holes are further surrounded by an outer wall 144, which also has in particular a thickness s2 of at least 0.1 mm. The measuring point body 142 is particularly easy and inexpensive to manufacture. Furthermore, only a small amount of barrier material is required to effectively protect the end sections 111, 121 and indirectly form a thermocouple 150. In addition, assembly of the measuring point body 142 in or to a casing 130 can be carried out inexpensively and simply, for example by a press fit.

Figure 7:
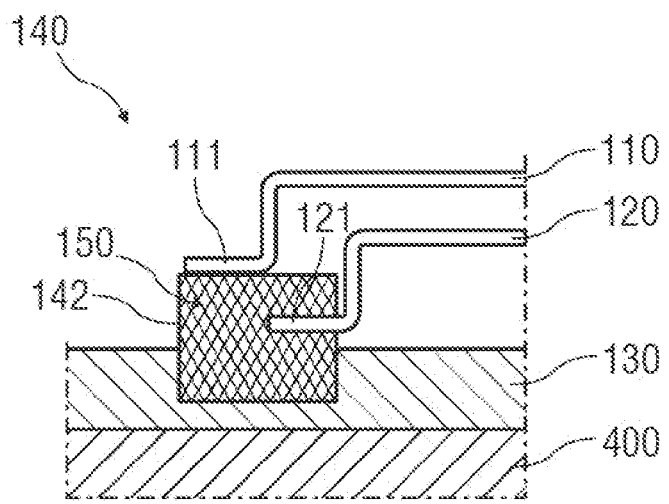
FIG. 7 is schematically a sectional representation of a measuring point body comprising two conductors.
Figure 8:
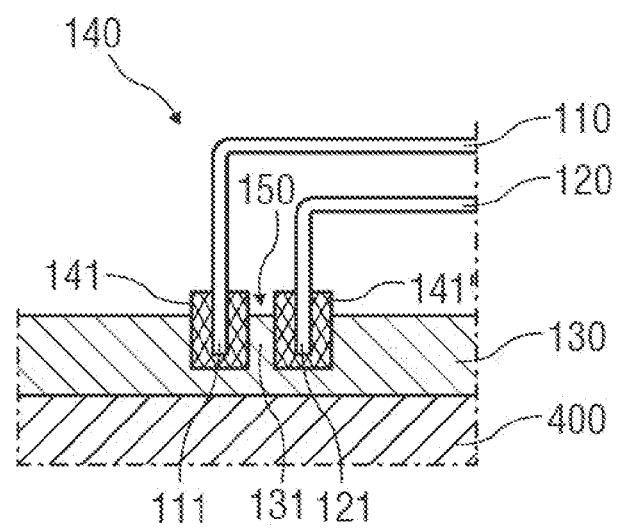
FIG. 8 is schematically a sectional representation of a measuring point body comprising two conductors.

FIGS. 7 and 8 show in sectional representations an exemplary measuring point body structure 140, which is arranged in a casing wall of a casing 130 shown only in sections. The casing 130 rests on a process structure 400. A first conductor 110 comprising an end section 111 and a second conductor 120 comprising an end section 121 are led to the measuring point body structure 140 and indirectly form a thermocouple 150 on or in this.

In FIG. 7, the measuring point body structure 140 comprises a single measuring point body 142, which is formed of a barrier material. The end section 121 of the second conductor 120 is included in the measuring point body 142. The end section 111 of the first conductor 110, on the other hand, is only in contact with a surface of the measuring point body 142. The two end sections 111, 121 indirectly form a thermocouple 150 via the barrier material of the measuring point body.

In FIG. 8, the measuring point body structure 140 comprises two separate measuring point bodies 141, 141', each of which is formed of a barrier material. The end section 111 of the first conductor 110 is received in the measuring point body 141. The end section 121 of the second conductor 120 is received in the measuring point body 141'. The two end sections 111, 121 indirectly form a thermocouple 150 via the barrier material of the measuring point bodies 141, 141' and via a section 131 of the material of the casing wall of the casing 130.

The measuring point body structure 140 shown in FIGS. 7 and 8 can be advantageously prepared cost-effectively and allow for the end sections 111, 121 of the two conductors 110, 120 to be effectively protected against impairments caused by environmental influences.

Figure 9:
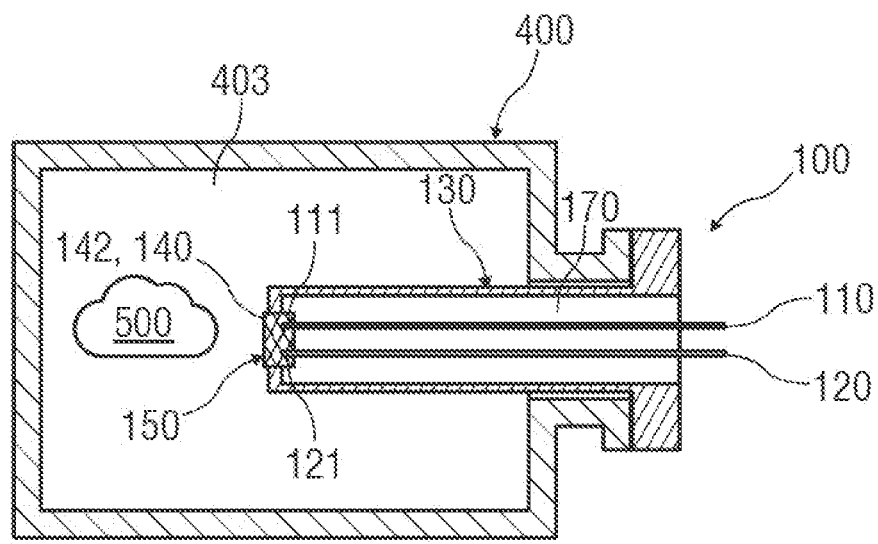
FIG. 9 is schematically a sectional representation of a temperature sensor comprising a measuring point body structure.

In FIG. 9, a temperature sensor 100 comprising a measuring point body structure 140 or comprising a measuring point body 142 is shown. The measuring point body 142 is formed of a barrier material. A first conductor 110 comprising an end section 111 and a second conductor 120 comprising an end section 121 are led to the measuring point body 142 by a free internal volume 170 of a casing 130. The casing 130 is formed in this example as a thermowell, which is inserted in sections into a process chamber 403 of a process structure 400. Within this process structure 400 is a process fluid 500, which is schematically indicated by a cloud shape, or the process fluid 500 flows through the process structure 400, if this is formed, for example, as a pipeline. The second conductor 120 is made from a different material than the first conductor 110. The end sections 111, 121 indirectly form a thermocouple 150 by contact with the measuring point body 142. The measuring point body 142 is arranged on the casing 130 in such a way that it penetrates a casing wall in sections and comes into direct contact with the process fluid 500. As a result, a particularly high measurement accuracy and a particularly short response time of the temperature sensor 100 can be achieved when measuring the temperature of the process fluid 500. At the same time, the barrier material of the measuring point body 142 effectively protects the end sections 111, 121 of the conductors 110, 120 against impairments caused by environmental influences, in particular also against diffusion effects.

Figure 10:
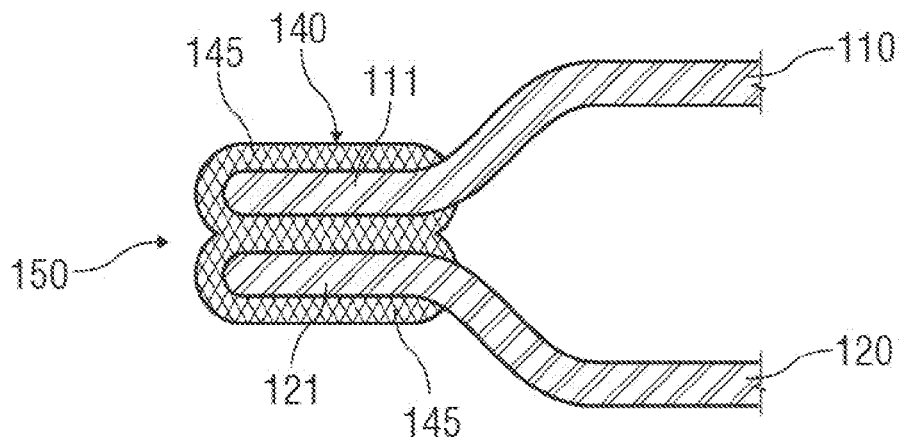
FIG. 10 is schematically a sectional representation of a measuring point body comprising two conductors.

FIG. 10 shows a measuring point body structure 140 comprising a first conductor 110 and a second conductor 120. The measuring point body structure 140 is formed as a coating 145 at an end section 111 of the first conductor 110 and at an end section 121 of the second conductor 120. The two end sections 111, 121 are guided against each other in such a way that their coatings 145 touch, in particular are connected to each other in a material-locking manner. The application of the coating 145 can be carried out, for example, by painting, wrapping in a film or immersion in a melt. The coating 145 is formed of a barrier material and is applied so thickly that it covers at least possible unevenness and roughness in the surface of the two end sections 111, 121. Nevertheless, in this way, the protective effect against impairments caused by environmental influences can be achieved effectively and with the least possible use of the barrier material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A temperature sensor comprising:
   a first conductor made of a first material comprising an end section;
   a second conductor made of a second material, which differs from the first material, the second conductor comprising an end section;
   a casing for receiving the end sections of the first and second conductors and for positioning in a process atmosphere or in a process fluid and/or on a surface of a process structure; and
   a measuring point body structure arranged within the casing or on the casing,
   wherein the first conductor and the second conductor directly or indirectly form a thermocouple in or on the measuring point body structure,
   wherein the measuring point body structure comprises a barrier material, and
   wherein, when compared at a same temperature, the barrier material has a lower diffusion coefficient for at least one foreign component than the materials of the first and second conductors, the at least one foreign component being present in the process atmosphere or in the process fluid or in the material of the casing or in the material of the surface of the process structure.

2. The temperature sensor according to claim 1, wherein the end sections of the first and second conductors are directly electrically connected to each other at a contact point, and wherein the contact point is within the barrier material of the measuring point body structure or the contact point abuts the barrier material of the measuring point body structure.

3. The temperature sensor according to claim 1, wherein the end sections of the first and second conductors are electrically connected to each other via at least one section of the measuring point body structure or via a section of the barrier material of the measuring point body structure and at least one section of the casing.

4. The temperature sensor according to claim 1, wherein the foreign component is formed of at least one of the following substances: carbon, or sulfur, or chromium, or nickel, or iron, or copper, or any component of the first and/or second material.

5. The temperature sensor according to claim 1, wherein the barrier material is or comprises: gold or a gold alloy, or platinum or a platinum alloy, or tantalum or a tantalum alloy, or tungsten or a tungsten alloy.

6. The temperature sensor according to claim 1, wherein the first and second conductors are led to the casing with a sheathed thermocouple or a mineral-insulated cable.

7. The temperature sensor according to claim 1, wherein the casing is welded or attached to the surface of the process structure.

8. The temperature sensor according to claim 1, wherein a free internal volume of the casing is filled with an electrical insulating material or with a mineral or ceramic insulating material.

9. The temperature sensor according to claim 1, wherein the measuring point body structure is at least partially in direct contact with the process fluid or the surface of the process structure.

10. The temperature sensor according to claim 1, wherein the end sections of the first and second conductors are electrically connected to each other via one or more material sections of the measuring point body structure or via a section of the barrier material of the measuring point body structure.

11. The temperature sensor according to claim 10, wherein the measuring point body structure comprises a single measuring point body, wherein the measuring point body receives the end sections of the first and second conductors or at least is in direct contact with the end sections, and wherein the measuring point body is formed of the barrier material.

12. A temperature sensor comprising:
   a first conductor made of a first material comprising an end section;
   a second conductor made of a second material, which differs from the first material, the second conductor comprising an end section;
   a casing for receiving the end sections of the first and second conductors and for positioning in a process atmosphere or in a process fluid and/or on a surface of a process structure; and
   a measuring point body structure arranged within the casing or on the casing,
   wherein the first conductor and the second conductor directly or indirectly form a thermocouple in or on the measuring point body structure,
   wherein the measuring point body structure comprises a barrier material, and
   wherein, when compared at a same temperature, the barrier material has a lower diffusion coefficient for at least one intrinsic component than the materials of the first and second conductors, the at least one intrinsic component being present in the material of the first conductor or in the material of the second conductor.

13. The temperature sensor according to claim 12, wherein the intrinsic component of the material of the first conductor or the second conductor is:
chromium, when the first and second conductors form a K type or N type thermocouple, or
nickel, when the first and second conductors form a T type thermocouple, or iron, copper, or nickel, when the first and second conductors form a J type thermocouple, or
rhodium, when the first and second conductors form an R type or S type or B type thermocouple, or
rhenium, when the first and second conductors form a C type or A type thermocouple, or
any component of the first material or the second material, which does not occur in the other conductor material or only at a significantly lower concentration.

14. A temperature sensor comprising:
a first conductor made of a first material comprising an end section;
a second conductor made of a second material, which differs from the first material, the second conductor comprising an end section;
a casing for receiving the end sections of the first and second conductors and for positioning in a process atmosphere or in a process fluid and/or on a surface of a process structure;
a measuring point body structure arranged within the casing or on the casing;
a third conductor made of a third material, the third conductor comprising an end section; and
a fourth conductor made of a fourth material, which differs from the third material, the fourth conductor comprising an end section,
wherein the first conductor and the second conductor directly or indirectly form a thermocouple in or on the measuring point body structure,
wherein the measuring point body structure comprises a barrier material, and
wherein the third conductor and the fourth conductor directly or indirectly form a reference junction in or on the measuring point body structure.

15. The temperature sensor according to claim 14, wherein the third conductor and/or the fourth conductor have a diameter greater than a diameter of the first conductor and/or the second conductor, and/or wherein the third material at least differs from the first and second material.

16. A temperature sensor comprising:
a first conductor made of a first material comprising an end section;
a second conductor made of a second material, which differs from the first material, the second conductor comprising an end section;
a casing for receiving the end sections of the first and second conductors and for positioning in a process atmosphere or in a process fluid and/or on a surface of a process structure; and
a measuring point body structure arranged within the casing or on the casing,
wherein the first conductor and the second conductor directly or indirectly form a thermocouple in or on the measuring point body structure,
wherein the measuring point body structure comprises a barrier material, wherein the end sections of the first and second conductors are electrically connected to each other via at least one section of the measuring point body structure or via a section of the barrier material of the measuring point body structure and at least one section of the casing, and
wherein the measuring point body structure comprises two separate measuring point bodies, wherein each of the measuring point bodies receives an end section of one of the first or second conductors or is in direct contact with the end section, and wherein the measuring point bodies are formed of the barrier material.

17. A temperature sensor comprising:
a first conductor made of a first material comprising an end section;
a second conductor made of a second material, which differs from the first material, the second conductor comprising an end section;
a casing for receiving the end sections of the first and second conductors and for positioning in a process atmosphere or in a process fluid and/or on a surface of a process structure; and
a measuring point body structure arranged within the casing or on the casing,
wherein the first conductor and the second conductor directly or indirectly form a thermocouple in or on the measuring point body structure,
wherein the measuring point body structure comprises a barrier material,
wherein the end sections of the first and second conductors are electrically connected to each other via one or more material sections of the measuring point body structure or via a section of the barrier material of the measuring point body structure,
wherein the measuring point body structure comprises a single measuring point body, wherein the measuring point body receives the end sections of the first and second conductors or at least is in direct contact with the end sections, and wherein the measuring point body is formed of the barrier material, and
wherein the measuring point body has a partition wall that is arranged between the end sections of the first and second conductors, the partition wall having a thickness of at least 0.1 mm, and/or wherein an outer wall of the measuring point body, which surrounds the end section of the first conductor and/or the end section of the second conductor, has a thickness of at least 0.1 mm.

18. A temperature sensor comprising:
a first conductor made of a first material comprising an end section;
a second conductor made of a second material, which differs from the first material, the second conductor comprising an end section;
a casing for receiving the end sections of the first and second conductors and for positioning in a process atmosphere or in a process fluid and/or on a surface of a process structure; and
a measuring point body structure arranged within the casing or on the casing,
wherein the first conductor and the second conductor directly or indirectly form a thermocouple in or on the measuring point body structure,
wherein the measuring point body structure comprises a barrier material,
wherein the end sections of the first and second conductors are electrically connected to each other via one or more material sections of the measuring point body structure or via a section of the barrier material of the measuring point body structure,
wherein the measuring point body structure comprises:
a single measuring point body that receives the end sections of the first and second conductors or at least is in direct contact with the end sections, the single measuring point body being formed of the barrier material, or two separate measuring point bodies that each receive an end section of one of the first or second conductors or is in direct contact with the end sections, the two separate measuring point bodies being formed of the barrier material and wherein the single measuring point body or the two separate measuring point bodies are formed by a coating or a finish of the end section of at least one of the first or second conductors with the barrier material or by wrapping the end section of at least one of the first or second conductors in a film made of the barrier material.

19. A temperature sensor comprising:
a first conductor made of a first material comprising an end section;
a second conductor made of a second material, which differs from the first material, the second conductor comprising an end section;
a casing for receiving the end sections of the first and second conductors and for positioning in a process atmosphere or in a process fluid and/or on a surface of a process structure; and
a measuring point body structure arranged within the casing or on the casing,
wherein the first conductor and the second conductor directly or indirectly form a thermocouple in or on the measuring point body structure,
wherein the measuring point body structure comprises a barrier material,
wherein the end sections of the first and second conductors are electrically connected to each other via one or more material sections of the measuring point body structure or via a section of the barrier material of the measuring point body structure,
wherein the measuring point body structure comprises:
a single measuring point body that receives the end sections of the first and second conductors or at least is in direct contact with the end sections, the single measuring point body being formed of the barrier material, or two separate measuring point bodies that each receive an end section of one of the first or second conductors or is in direct contact with the end sections, the two separate measuring point bodies being formed of the barrier material, and wherein the single measuring point body or the two separate measuring point bodies are arranged in or on the casing by press-fitting.

20. A temperature sensor comprising:
a first conductor made of a first material comprising an end section;
a second conductor made of a second material, which differs from the first material, the second conductor comprising an end section;
a casing for receiving the end sections of the first and second conductors and for positioning in a process atmosphere or in a process fluid and/or on a surface of a process structure; and
a measuring point body structure arranged within the casing or on the casing,
wherein the first conductor and the second conductor directly or indirectly form a thermocouple in or on the measuring point body structure,
wherein the measuring point body structure comprises a barrier material, and
wherein, when compared at a same temperature, the barrier material has a higher thermal conductivity and/or a lower electrical resistance and/or a higher chemical inertia and/or a lower catalytic force than the materials of the first conductor and/or the second conductor and/or the casing.

\* \* \* \* \*